M. GOHLKE.
CAGE FOR BALL BEARINGS.
APPLICATION FILED FEB. 28, 1911.
1,122,586.
Patented Dec. 29, 1914.
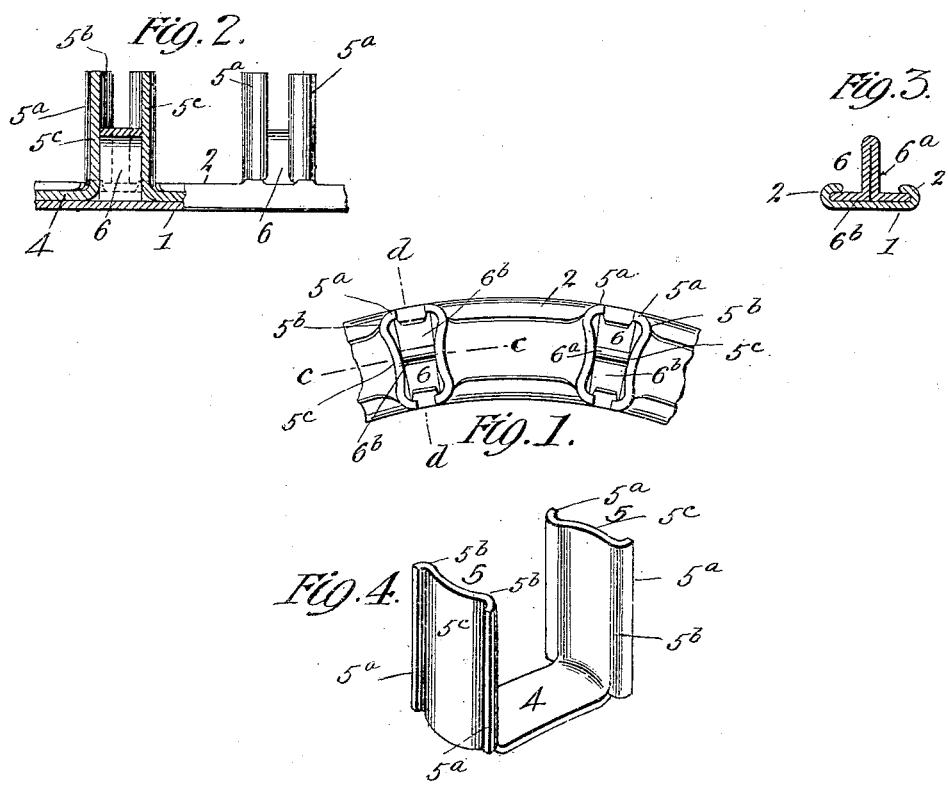

1,122,586.

UNITED STATES PATENT OFFICE.

MAX GOHLKE, OF BERLIN, GERMANY.

CAGE FOR BALL-BEARINGS.

1,122,586.  Specification of Letters Patent.  Patented Dec. 29, 1914.

Application filed February 28, 1911. Serial No. 611,438.

*To all whom it may concern:*

Be it known that I, MAX GOHLKE, a subject of the German Emperor, residing at Berlin-Pankow, Florastrasse 5/6, Berlin, Germany, have invented certain new and useful Improvements in Cages for Ball-Bearings, of which the following is a specification, reference being had therein to the accompanying drawing.

This invention relates to cages or spacing devices employed in connection with anti-friction bearings to maintain the rolling elements in proper spaced relations, a common form of cage for this purpose embodying a ring or support equipped with ball holding members in the form of fingers adapted to be bent down on the balls and serving to confine them and maintain their spaced relations, while permitting the free rotation of the balls in the cage. When cages of this type are constructed of thin metal, which is desirable for lightness, the downwardly bent fingers are liable, in the action of the bearing to become displaced and in some cases bent upwardly again, thus releasing the balls so that the proper spaced relations of the same will be destroyed.

It is the aim of the present invention to overcome this objection and the invention consists, primarily, in providing the ball confining fingers with longitudinal strengthening or stiffening means, preferably in the form of ribs, by which the fingers will be retained in their bent form on the balls and will effectually resist the tendency to become accidentally displaced.

The invention consists also in the provision of bracing devices for the ball confining fingers, said bracing devices being so disposed that they will coöperate with the fingers in resisting their tendency to be displaced from their proper confining relation to the balls.

The invention consists also in the details of construction and combination of parts hereinafter described and claimed.

In the accompanying drawings: Figure 1 is a plan view of a portion of a cage showing my invention and illustrating the bracing devices for the confining fingers. Fig. 2 is a longitudinal section on the line *c—c* of Fig. 1. Fig. 3 is a cross section on the line *d—d* of Fig. 1. Fig. 4 is a perspective view of one of the ball holding members and one of the coöperating bracing devices showing the operative relations of the same.

Referring to the drawings: The cage comprises a sheet metal supporting ring 1 provided with edge flanges 2, and a series of ball holding members, each consisting of a single piece of sheet metal having a base portion 4 seated on the ring, and opposing upwardly extending fingers 5, adapted to be bent downwardly and inwardly on the balls to confine them, as usual, while permitting their free rotary movement between the fingers. These ball holding members may be secured to the supporting ring in any suitable manner, but I prefer to attach them by bending the opposite edge flanges of the ring down on the side edges of the base portions 4, as shown particularly in Fig. 3, which manner of fastening the members will permit their convenient removal in case of injury.

In order to strengthen the fingers and render them stiff I provide the fingers with longitudinally extending strengthening means preferably in the form of flanges $5^a$ on the edges of the fingers, and inwardly extending ribs $5^b$ adjacent the flanges, and further, outwardly extending ribs $5^c$ on the central portion of the fingers. These outwardly extending central ribs $5^c$ present on the inner sides of the fingers, transversely curved surfaces which conform to the curvature of the ball surface, and when the fingers are bent downwardly on the balls the latter are embraced by the fingers both in a direction circumferential of the ring and in directions transversely of the same It is obvious that the detailed form of the ball holding fingers and the manner of securing them to the supporting ring may be variously modified within the knowledge of a skilled mechanic; and so also the longitudinal strengthening means may be in the form of flanges, or ribs, as shown in Fig. 4, the essential feature of the invention in this respect being the provision of longitudinally extending strengthening means for the fingers, which will act to stiffen them and prevent their accidental displacement from the balls.

In order to brace the confining fingers and reinforce them against the tendency to become displaced accidentally, I provide a series of bracing devices 6, which are situated between the adjacent fingers of the adjoining ball holding members, and which serve to prevent the fingers from bending outwardly from the balls. These bracing devices may be of any proper form or material which will adapt them for the purposes in view, but I prefer to construct them each of a single plate of sheet metal folded on itself at its central portion to produce an upstanding flat web 6ª, the ends of the plate being bent outwardly in opposite directions and at right angles, to produce supporting feet 6ᵇ, which latter are seated on the ring so that the upstanding web will be presented edgewise to the confining fingers, the said feet being fastened to the ring in any suitable manner, conveniently by bending the edge flanges of the ring down on the edges of the feet. As a result of this construction and arrangement of the bracing devices, the ball confining fingers will be effectually held from spreading out or being displaced from the balls, and the several holding members and interposed bracing devices, will give mutual circumferential support to each other. If desired, the edges of the web of the bracing device may be soldered or welded to the sides of the fingers where they bear against the same, but this is not essential to the effective action of the device in properly supporting the fingers.

It will be manifest to the skilled mechanic that the details of the several parts may be variously changed and modified without departing from the limits of my invention; and it will be understood that the invention is not limited to any particular form or construction of the parts, except in so far as such limitations are specified in the claims.

Having thus described my invention, what I claim is:—

1. A ball holding cage provided with laterally extending ball confining fingers, in combination with bracing devices extending between and bearing against the adjacent faces of said fingers.

2. A ball holding cage comprising in combination, a supporting ring, laterally extending ball confining fingers carried by the ring, and bracing devices fixed to the ring and coöperating with the fingers.

3. A ball holding cage comprising a series of pairs of ball confining fingers adapted to be bent downwardly on the balls to confine them, and bracing devices mounted on the ring between the pairs of fingers and coöperating with said fingers.

4. A ball holding cage comprising in combination a supporting ring, a series of pairs of ball confining fingers secured to the ring and adapted to be bent downwardly on the balls to confine them, and separate bracing devices secured to the ring between the pairs of ball confining fingers and coöperating with the said fingers in preventing their displacement from the balls.

In testimony whereof I affix my signature in presence of two witnesses.

MAX GOHLKE.

Witnesses:
 HENRY HASPER,
 WOLDEMAR HAUPT.

Copies of this patent may be obtained for five cents each, by addressing the "Commissioner of Patents, Washington, D. C."